Jan. 16, 1968     AKIRA WATANABE     3,364,406
PROTECTIVE SYSTEM FOR MOTORS OF ELECTRIC CARS
Filed Nov. 9, 1964

CONTROLLER

BY Akira Watanabe

INVENTOR.

George B. Auerbach
Attorney

United States Patent Office 3,364,406
Patented Jan. 16, 1968

3,364,406
PROTECTIVE SYSTEM FOR MOTORS OF ELECTRIC CARS
Akira Watanabe, Tokyo, Japan, assignor to Tokyo Shibaura Electric Co., Ltd., Kawasaki-shi, Japan
Filed Nov. 9, 1964, Ser. No. 409,852
Claims priority, application Japan, Nov. 7, 1963, 38/84,194
1 Claim. (Cl. 318—52)

ABSTRACT OF THE DISCLOSURE

A protective device for an electric car, comprising at least two driving motors connected in parallel, a DC saturable reactor including a pair of primary conductors or windings through which currents of said driving motors flow in opposite directions, a secondary winding energized from a source of alternating current, and a relay current responsive to a current flowing through said secondary winding to deenergize said drive motors. Additional relay switches are provided which act in a predetermined sequence to achieve the results desired.

---

This invention relates to a protective device for electric cars and more particularly to an improved device effective to protect driving motors when car wheels slip on rails or when flashover occurs between brushes.

In a prior protective device of the type referred to above an electric bridge is formed comprising a first branch, including serially connected driving motors and second, a resistance branch in parallel with said first branch. A protective relay is connected across the output terminals of said bridge, i.e. between the junction of said driving motors and the midpoint of the resistance. So long as the terminal voltages of the driving motors are equal, or during normal operation of the electric car the relay does not operate but does operate to interrupt the circuit of driving motors when the terminal voltage of any one of the driving motors decreases owing to wheel slip or brush flashover. While this arrangement is satisfactory where two or more motors are connected in series, it can not be used for motors connected in parallel.

However, in electric cars it is often desirable to connect electric motors in parallel. In such an arrangement it has been the practice to mount tachometer generators on the respective motor shafts and constitute said electric bridge by combining these tachometer generators, a resistor and a protective relay in the same manner as above described. However this arrangement is disadvantageous in that it requires a tachometer generator for each driving motor and cannot detect flashover faults of the motor.

Accordingly, it is an object of this invention to provide an improved protective device for electric cars which can eliminate these disadvantages.

A more specific object of this invention is to provide a novel protective device for electric cars utilizing a plurality of driving motors connected in parallel, which can protect the driving motors against flashover, wheel slip and the like unbalanced condition without the necessity of providing tachometer generators.

Briefly stated in accordance with this invention there is provided a protective device for an electric car, comprising at least two driving motors connected in parallel, a DC saturable reactor including a pair of primary conductors or windings through which currents of said driving motors flow in opposite directions, a secondary winding energized from a source of alternating current, and a relay circuit responsive to a current flowing through said secondary winding to deenergize said drive motors. Since a saturable reactor is utilized as means for detecting fault the novel protective device can respond not only to wheel slip but also to flashover without utilizing any tachometer generator.

Figure 1:
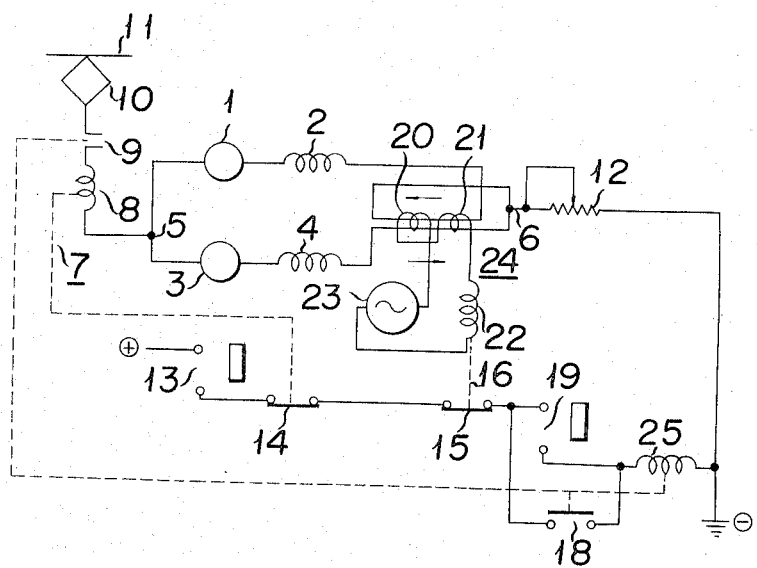
Figure 2:
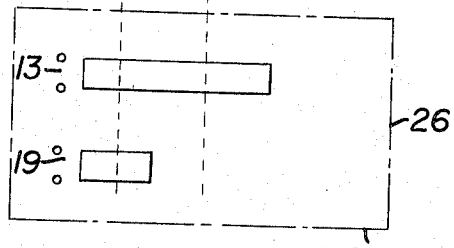

Further objects and advantages of the present invention will be apparent from the following description, reference being had to the accompanying drawings, wherein:

FIG. 1 illustrates a connection diagram of a protective device embodying this invention; and FIG. 2 shows diagrammatically the sequential operation of the master controller.

Referring now to FIG. 1 there are shown two series motors comprising armatures 1 and 3 and series field windings 2 and 4 respectively, which are connected in parallel across two points 5 and 6. The point 5 is connected to a trolley wire 11 via a pantograph 10, a circuit breaker 9 and an operating coil 8 of an over current relay 7 while the point 6 is grounded through a starting resistor 12.

To provide usual powering and braking control a source of control potential indicated by + and − signs are provided. Since the usual control device is not material to this invention it is eliminated from the drawing. As shown, a closing and opening control coil 25 of the circuit breaker 9 is connected across the source of control potential through a contact 13 which is closed when a master controller 26, shown in a schematic diagram in FIG. 2, is moved to its running position, a normally closed contact 14 which is opened when the over current relay 7 operates, a normally closed contact 15 which is opened when a protective relay 16 operates as more fully described later, a normally open auxiliary contact 18 which is closed when the circuit breaker 9 closes. Further in parallel with the normally opened auxiliary contact 18 of the circuit breaker 9 is connected a contact 19 of the master controller 26 which is arranged to be closed at the first step only of the master controller. FIG. 2 shows in diagrammatic form the sequential operation of the master controller. Both contacts 19 and 13 are closed initially, contact 19 then being opened while contact 13 remains closed through other positions. Functions of the master controller also include closing the circuit breaker at the first step and sequentially short-circuiting the starting resistor at the second step or following steps thereafter. As schematically shown in FIG. 1, positions of the parallel circuits between points 5 and 6 are disposed to carry currents in opposite directions, and these portions are disposed to extend through a window of a closed magnetic path of a magnetic core, not shown. A pair of alternating current coils 20 and 21 are wound on a leg of the magnetic core and are connected in series opposition to form a saturable reactor 24 operates as a DC current transformer. The series windings 20 and 21 are energized from a source of alternating current 23 through an operating coil 22 of a protective relay 16.

The operation of the protective device of this invention is as follows:

To start the electric car, the master controller 26 is operated to its powering position to close the contact 13. While the master controller comes to the first step so that its contact is closed, then, coil 25 of the circuit breaker 9 will be energized to close it through a circuit extending from the positive terminal of the source of control potential, through the contact 13, normally closed contact 14 of the over current relay 7, the normally closed contact 15 of the relay 16, first step contact 19 of the master controller, to the negative terminal. Concurrently therewith the normally open contact 18 of the circuit breaker will close a holding circuit for the coil 25 so that if the first step contact 19 is opened, coil 25 of circuit breaker 9 will hold the condition. So long as there is no over current flowing through the driving motors, the contact 14 is maintained closed and the circuit breaker 9 will be maintained closed until the relay 16 opens its contact. With substantially equal currents flowing through the parallel motors 1 and 3, currents of substantially equal magnitudes but of opposite directions will flow through two DC conductors or primary conductors of the saturable reactor 24 so that the magnetic flux in the magnetic core thereof will be substantially zero. Under this condition the impedance of the coils 20 and 21 wound upon the core is high so that no appreciable current will flow through the coil 22 of the relay 16 from the AC source 23. Thus the relay 16 will not open the contact 15 and the circuit breaker 9 will not be opened. In this way the master controller is advanced to sequentially short circuit the starting resistor 12 to gradually accelerate the electric car.

If substantial difference in currents flowing through parallel circuits occurs due to flash over between brushes or wheel slip of one of the driving motors, a flux proportional to the difference in currents flowing through two primary conductors of the DC current transformer 24 will be created in the magnetic core thereof to greatly decrease the impedance of the coils 20 and 21, thus causing a large current to flow through the coil 22 of the relay 16 from the AC source 23. Thus, the relay 16 will be operated to open its contact 15 to deenergize the coil 25, whereby the circuit breaker 9 will be opened to deenergize the driving motors.

Once the circuit breaker 9 is opened, its auxiliary contact 18 also will be opened and contact 15 of relay 16 is maintained open so that coil 25 cannot be energized until contacts 15 and 19 are again closed. When over current relay 7 is operated to open its contact 14, the circuit breaker 9 will be opened similarly to deenergize the driving motors. Coil 8 is responsive to the total DC current coming from source 11 and hence is an additional safety feature independent of the difference in current between motors 1 and 3.

Thus it will be apparent that this invention provides a novel and inexpensive protective device for parallel connected driving motors for electric cars which affords positive protection not only for flashover faults but also for wheel slip faults without the necessity of mounting individual tachometer generators on respective motor shafts or car axles.

Although above description refers to the powering operation of the electric car it is of course to be understood that the invention is also effective during braking. Especially in electric cars equipped with regenerative braking system, chance of wheel slip and hence burn out of the driving motors is increased by concurrent application of regenerative braking and pneumatic braking. The protective device of this invention is especially effective for such an application. This invention is also applicable to electric cars employing dynamic braking.

If desired, the saturable reactor 24 can be used for providing alarm, indication or other protective feature.

In alternating current electric cars two groups of motors are energized by separate rectifiers. In such a case a saturable reactor 24 and a relay 16 as above described are included in the respective motor groups.

While the invention has thus been described and a prefered embodiment shown, the invention is obviously not limited to this shown embodiment, but instead many modifications will occur to those skilled in the art which will lie within the spirit and scope of the invention as defined in the appended claim.

What is claimed is:

1. A protective device for an electric car comprising a DC power source, a pair of DC driving motors connected in parallel with each other between said DC power source, a circuit breaker and an operating coil of an over current relay connected in series with said driving motors, a saturable reactor including a pair of primary windings through which currents of said driving motors flow in opposite directions and a secondary winding energized from an AC power source, said reactor having a high impedance when the magnitudes of said primary currents in opposite directions are substantially equal and cancel each other and a low impedance when there is a difference in the magnitudes of said primary currents, an operating coil of a protective relay having a first set of contacts, said operating coil connected in series with said secondary winding of said reactor together with said AC source, a control coil for said circuit breaker connected between the terminals of said DC power source through a second set of contacts to be closed in all positions of a master controller, a third set of contacts to be opened when said over current relay operates, and a fourth set of contacts to be closed only when the master controller comes to a first step, all of said above sets of contacts being in series with said control coil, and an auxiliary set of contacts connected in parallel with said fourth set of contacts and operated by said control coil thereby forming a holding circuit for said circuit breaker whereby when the currents are unequal, said reactor has a low impedance thereby energizing said protective relay and causing the circuit to said driving motors to be deactivated.

References Cited

UNITED STATES PATENTS 2,543,622   2/1951   Edwards et al. _____ 318—52

ORIS L. RADER, *Primary Examiner.*

B. A. COOPER, *Assistant Examiner.*